US012793542B2

(12) United States Patent
Kim

(10) Patent No.: US 12,793,542 B2
(45) Date of Patent: Nov. 10, 2026

(54) NAVIGATION APPARATUS AND METHOD FOR EXTRACTING TRAFFIC LIGHT INFORMATION IN DRIVING DIRECTION ACCORDING TO NAVIGATION ROUTE

(71) Applicants: HYUNDAI MOTOR COMPANY, Seoul (KR); KIA CORPORATION, Seoul (KR)

(72) Inventor: Chi Hwan Kim, Hanam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 16 days.

(21) Appl. No.: 18/931,841

(22) Filed: Oct. 30, 2024

(65) Prior Publication Data

US 2025/0182615 A1 Jun. 5, 2025

(30) Foreign Application Priority Data

Dec. 4, 2023 (KR) ........................ 10-2023-0173213

(51) Int. Cl.

*G08G 1/01* (2006.01)
*G08G 1/0967* (2006.01)
*G08G 1/16* (2006.01)

(52) U.S. Cl.

CPC ......... *G08G 1/0141* (2013.01); *G08G 1/0116* (2013.01); *G08G 1/096725* (2013.01); *G08G 1/164* (2013.01)

(58) Field of Classification Search

CPC ............... G08G 1/0141; G08G 1/0116; G08G 1/096725; G08G 1/164; G08G 1/096716; G08G 1/0125; G08G 1/0137; G08G 1/095; G08G 1/096766; G08G 1/075; G01C 21/3492; G01C 21/3629; G01C 21/3691; G01S 19/13; G06Q 50/40

See application file for complete search history.

(56) References Cited

U.S. PATENT DOCUMENTS

2021/0217306 A1* 7/2021 Urmson ........... G08G 1/096775

FOREIGN PATENT DOCUMENTS

KR 10-2022-0168118 A 12/2022

* cited by examiner

*Primary Examiner* — Alan D Hutchinson
(74) *Attorney, Agent, or Firm* — Morgan, Lewis & Bockius LLP

(57) ABSTRACT

A navigation apparatus for extracting traffic light information in a driving direction according to a navigation route includes one or more processors and a storage medium storing a computer-readable instruction, wherein the computer-readable instruction executed by the one or more processors, causes the one or more processors to receive traffic light information in real time from a traffic light provided in a location, located in front of a vehicle driving along a preset navigation route, and extract traffic light information in the driving direction from the traffic light information received in real time, wherein the traffic light information in the driving direction includes a remaining time of a direction signal indicating the driving direction according to the navigation route at the location.

18 Claims, 5 Drawing Sheets

NAVIGATION INFORMATION(310) ⟺ TRAFFIC LIGHT INFORMATION(320)

FIG. 3A

| NODE ID | NODE NAME | Lat | Lon |
|---|---|---|---|
| 1489 | SUSEO STATION | 37.487342 | 12.7101692 |

| INTERSECTION ID | INTERSECTION NAME | mapCtpIntLat | mapCtpIntLot |
|---|---|---|---|
| 101 | SUSEO STATION | 37.487342 | 12.7101692 |

FIG. 3B

| ENTRY LINK CANDIDATE | LINK ANGLE/VEHICLE FLOW-BASED ENTRY LINK |
|---|---|
| LINK1, 80DEGREES | - |
| LINK2, 150DEGREES | LINK2(150DEGREES) |
| LINK3, 240DEGREES | - |
| LINK4, 330DEGREES | LINK4(330DEGREES) |

| DIRECTION SIGNAL | REMAINING TIME-BASED ENTRY DIRECTION |
|---|---|
| NORTH GO-STRAIGTH SIGNAL | NORTH |
| SOUTH GO-STRAIGTH SIGNAL | SOUTH |

FIG. 3C

| ENTRY/EXIT LINK CANDIDATE (BASED ON LINK 4) | VEHICLE FLOW-BASED ENTRY/EXIT LINK |
|---|---|
| LINK4 -> LINK1 | - |
| LINK4 -> LINK2 | LINK4 ->LINK2 |
| LINK4 -> LINK3 | - |
| LINK4 -> LINK4(U TURN) | - |

| DIRECTION SIGNAL CANDIDATE (BASED ON NORTH) | REMAINING TIME-BASED ENTRY DIRECTION |
|---|---|
| NORTH -> LEFT TURN | - |
| NORTH -> GO-STRAITH | NORTH -> GO-STRAITH |
| NORTH -> RIGHT TURN | - |
| NORTH -> NORTH (UTURN) | - |

FIG. 3D

| INTERSECTION ID | ENTRY DIRECTION | DIRECTION SIGNAL | NODE ID | ENTRY LINK | EXIT LINK |
|---|---|---|---|---|---|
| 101 | NORTH | GO-STRAIGHT | 1489 | LINK4 | LINK2 |

NAVIGATION APPARATUS AND METHOD FOR EXTRACTING TRAFFIC LIGHT INFORMATION IN DRIVING DIRECTION ACCORDING TO NAVIGATION ROUTE

CROSS-REFERENCE TO RELATED APPLICATION(S)

The present application claims priority to Korean Patent Application No. 10-2023-0173213 filed on Dec. 4, 2023, the entire contents of which is incorporated herein for all purposes by this reference.

BACKGROUND OF THE PRESENT DISCLOSURE

Field of the Present Disclosure

The present disclosure relates to a navigation apparatus and method for extracting traffic light information in a driving direction according to a navigation route.

Description of Related Art

A navigation apparatus is an apparatus helping drivers reach their destinations conveniently by displaying routes to the destinations according to set routes.

Generally, a navigation system outputting traffic light information with audio signals when there is a traffic light ahead is disclosed.

However, traffic light information using the related art method is unrelated to a preset navigation route, and a current status of a traffic light ahead is merely output without a remaining time. Therefore, if the status of the traffic light changes, while passing through an intersection while looking at the current status of the traffic light ahead, there may be a risk of an accident.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a navigation apparatus and method of extracting traffic light information in a driving direction according to a navigation route, to prevent the risk of accidents when passing through locations, such as intersections.

According to an aspect of the present disclosure, a navigation apparatus for extracting traffic light information in a driving direction according to a navigation route includes: one or more processors; and a storage medium storing a computer-readable instruction, wherein the computer-readable instruction executed by the one or more processors, causes the one or more processors to receive traffic light information in real time from a traffic light provided in a location, located in front of a vehicle driving along a preset navigation route, and extract traffic light information in the driving direction from the traffic light information received in real time, wherein the traffic light information in the driving direction includes a remaining time of a direction signal indicating the driving direction according to the navigation route at the location.

According to another aspect of the present disclosure, a method of extracting traffic light information in a driving direction according to a navigation route includes: a first operation of receiving traffic light information in real time from a traffic light provided in a location, located in front of a vehicle driving along a preset navigation route; and a second operation of extracting traffic light information in the driving direction from the traffic light information received in real time, wherein the traffic light information in the driving direction includes a remaining time of a direction signal indicating the driving direction according to the navigation route at the location.

According to another aspect of the present disclosure, a computer-readable storage medium on which a program for executing the above method on a computer is recorded is provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3A, FIG. 3B, FIG. 3C and FIG. 3D are diagrams illustrating a process of generating a matching table according to an exemplary embodiment of the present disclosure.

Figure 1:
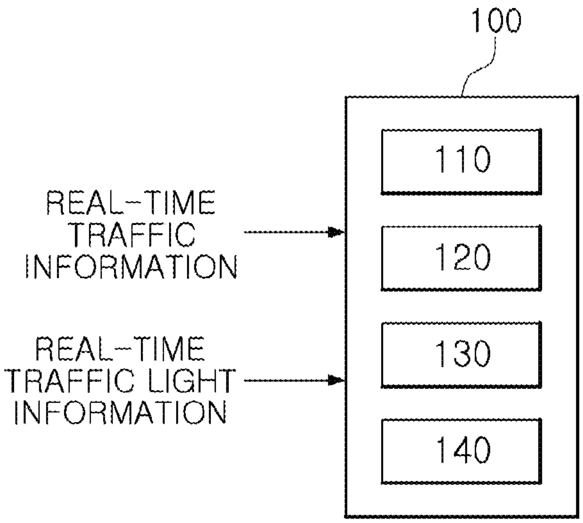
FIG. 1 is a diagram illustrating a navigation apparatus for extracting traffic light information in a driving direction according to a navigation route according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure are described with reference to the accompanying drawings. The following description is provided to aid in the comprehensive understanding of methods, devices, and/or systems included in the particularities. However, the following description is merely exemplary and not provided to limit the present disclosure.

In the following description of the present disclosure, a detailed description of known functions and configurations incorporated herein will be omitted when it would make the subject matter of the present disclosure unclear. The terms used in the present specification are defined in consideration of functions used in the present disclosure, and may be changed according to the intent or conventionally used methods of clients, operators, and users. Accordingly, definitions of the terms should be understood based on the entire description of the present specification. Terms used in the following description are merely provided to describe embodiments of the present disclosure and are not intended to be limiting of the inventive concept. As used herein, the singular forms "a," "an" and "the" are intended to include the plural forms as well, unless the context clearly indicates otherwise. It will be further understood that the terms "comprises" or "has" when used in the present specification, specify the presence of stated features, integers, steps, operations, elements, or a portion or combination thereof, but do not preclude the presence or addition of one or more other features, integers, steps, operations, elements, or a portion or combination thereof.

FIG. 1 is a diagram illustrating a navigation apparatus 100 of extracting traffic light information in a driving direction according to a navigation route according to an exemplary embodiment of the present disclosure. The navigation apparatus 100 may include a communication unit 110, a controller 120, an input/output (I/O) unit 130, and a storage unit 140.

The navigation apparatus 100, which extracts traffic light information in a driving direction according to a navigation route described above, is a device that displays a route to a destination and a position of a vehicle on a map according to a set route and includes a processor (e.g., a computer, a micro-processor, a CPU, an ASIC, a logic circuit, and the like) and a memory storing software instructions providing the aforementioned functions when executed by the processor. Here, the processor and memory may be implemented as separate semiconductor circuits. Alternatively, the processor and memory may be implemented as a single integrated semiconductor circuit. There may be one or more processors.

First, the communication unit 110 may receive traffic light information from a traffic light provided at a location in front of a vehicle traveling along a preset navigation route in real time or receive traffic information at the location in real time.

The aforementioned location may be a location, such as an intersection or crosswalk in which traffic lights are provided, and hereinafter, in an exemplary embodiment of the present disclosure, an intersection is referred to as an example.

Figure 2:
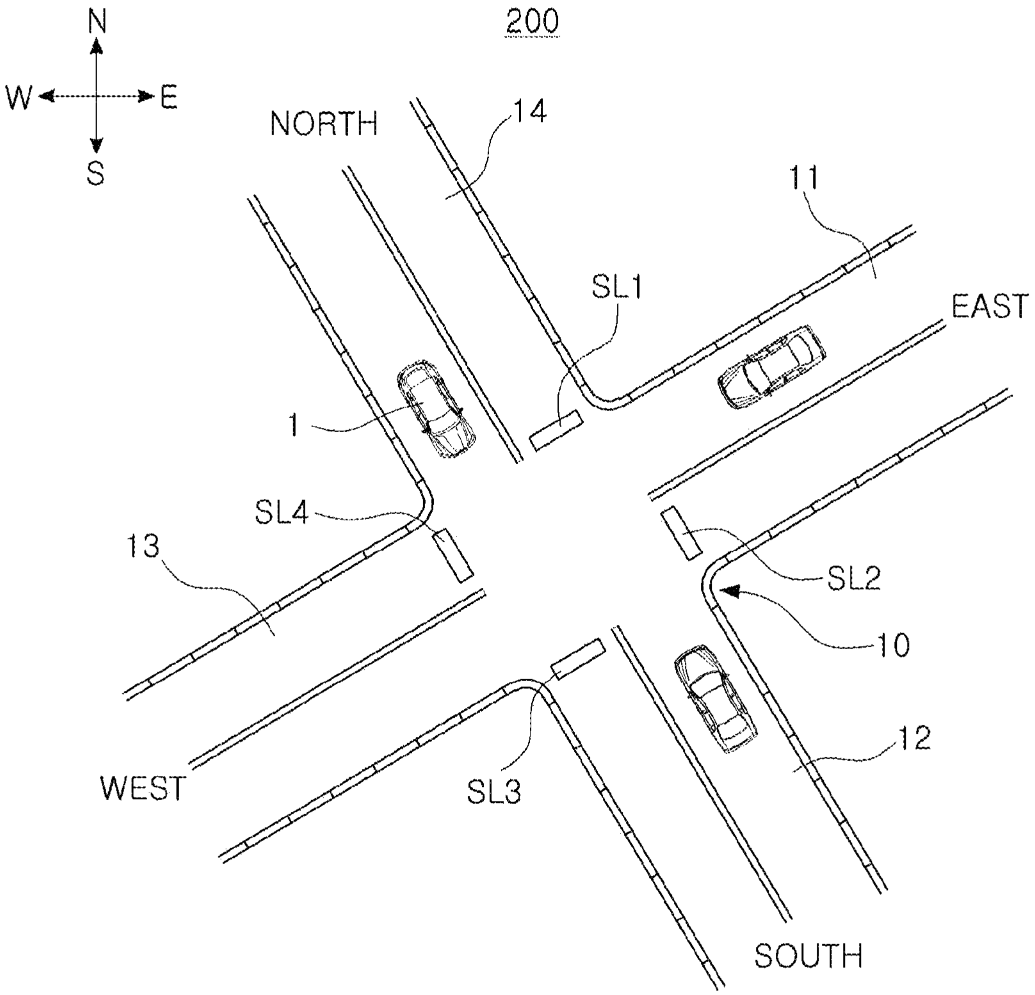
FIG. 2 is a diagram illustrating an intersection to which a navigation apparatus according to an exemplary embodiment of the present disclosure is applied.

FIG. 2 illustrates an intersection to which a navigation apparatus according to an exemplary embodiment of the present disclosure is applied.

That is, an intersection 200 as illustrated in FIG. 2 includes a node 10 and a plurality of links 11, 12, 13 and 14 connected to the node 10, and traffic lights SL1, SL2, SL3 and SL4 may be provided to control flow a vehicle 1 traveling in the links 11, 12, 13 and 14. Furthermore, it should be noted that the directions north, south, east, and west refer to entry directions of the intersection provided by the Road Traffic Authority and do not correspond to the directions N, S, E, and W based on the magnetic field. Hereinafter, the location will be described as the intersection 200 as an example.

Meanwhile, the traffic light information received in real time as described above may include an intersection ID (e.g., 101) of the intersection 200, a name (e.g., Suseo Station) of the intersection 200, position information (a latitude and a longitude) of the intersection 200, an entry direction (e.g., north, south, east, and west) of the intersection 200, direction signal (go straight, turn left, etc.), and remaining time (e.g., 30 seconds). Furthermore, the aforementioned real-time traffic information may include real-time position information of vehicles at the intersection 200.

The controller 120 may extract traffic light information in the driving direction from the traffic light information received in real time. Here, the traffic light information in the driving direction may include a remaining time of the direction signal indicating the driving direction according to a navigation route at the intersection 200.

For example, if the navigation route is go-straight, the remaining time of the direction signal indicating the driving direction according to the navigation route may be a remaining time of a go-straight signal, if the navigation route is a left turn, the remaining time of the direction signal indicating the driving direction according to the navigation route may be a remaining time of a left-turn signal, if the navigation route is a U-turn, the remaining time of the direction signal indicating the driving direction according to the navigation route may be a remaining time of a stop signal, and if the navigation route is a right turn, the remaining time of the direction signal indicating the driving direction according to the navigation route may be a remaining time of a go-straight signal or a remaining time of a left-turn signal.

Meanwhile, when the above location is a crosswalk, if the navigation route is go-straight, the remaining time of the direction signal indicating the driving direction according to the navigation route may be a remaining time of a go-straight signal, if the navigation route is a U-turn, the remaining time of the direction signal indicating the driving direction according to the navigation route may be a remaining time of a stop signal.

The controller 120 may extract the remaining time of the direction signal based on a matching table in which traffic light information received in real time is matched with navigation information.

Here, the navigation information may map data information including a node ID (e.g., 1489) of the node 10 corresponding to the intersection 200 located in the navigation route, a name (e.g., Suseo Station) of the node 10, position information (latitude and longitude) of the node 10, and a link ID (e.g., link 1 to link 4) of each of the links 11, 12, 13 and 14 connected to the node 10.

In general, the Road Traffic Authority provides traffic light information in real time, and traffic light information provided in real time at the intersection 200 includes an entry direction, a direction signal, and a remaining time.

For example, as traffic light information at an intersection, 'North left turn signal remaining time 30 seconds' means that a remaining time of a left turn signal for a vehicle entering through the north side of the intersection is 30 seconds, and 'South go-straight signal remaining time 30 seconds' means that a remaining time of a go-straight signal for a vehicle entering through the south side of the intersection is 30 seconds.

Meanwhile, the navigation route includes links and nodes, the vehicle drives along the links and nodes included in the route, and the directions of the links and traffic light information of the navigation route are not separately matched. Therefore, to extract traffic light information in the driving direction according to the navigation route from traffic light information, it is necessary to generate a matching table in advance in which the navigation information is matched with traffic light information.

Hereinafter, a process of generating a matching table will be described.

FIG. 3A, FIG. 3B, FIG. 3C and FIG. 3D are diagrams illustrating the process of generating a matching table according to an exemplary embodiment of the present disclosure. In FIGS. 3A-3D, the left side represents navigation information 310, and the right side represents traffic light information 320. The traffic light information currently received in real time is illustrated in Table 1 below. According to Table 1, vehicles drive from north to south and from south to north at the intersection 200, respectively, and the remaining time for the traffic lights is all 30 seconds. All the other direction signals have a remaining time of 0 seconds.

TABLE 1

| Intersection ID - 101 | |
|---|---|
| Direction signal | Remaining time |
| North go-straight signal | 30 seconds |
| South go-straight signal | 30 seconds |
| West left turn signal | 0 second |
| . . . | . . . |

In FIG. 3A, the node ID (e.g., 1489) of the node 10 corresponding to the intersection 200, the name (e.g., Suseo Station) of the node 10, and the position information (Lat and Lon) of the node 10 in the navigation information 310 may be matched with the intersection ID (e.g., 101), the name (e.g., Suseo Station) of the intersection 200, and the position information (mapCptIntLat and mapCtpIntLot) of the intersection 200 in the traffic light information 320, respectively.

Next, the entry link to the node 10 in the navigation information 310 is matched with the entry direction of the traffic light information 320.

That is, as illustrated in FIG. 3B, in the navigation information 310, entry links based on at least one of a link angle and vehicle flow according to real-time traffic information are link 4 and link 2. In FIG. 3B, angle means an angle of each link (links 1 to 4) in a clockwise direction based on the north pole (N) of the magnetic field as 0 degrees. The reason for considering the vehicle flow basis according to real-time traffic information in addition to the link angle is because, when the angle of the entry link is tilted or there is distortion of the entry link, it is not easy to match with the entry direction of the traffic light information only with the link angle alone. Meanwhile, according to the direction signal of the traffic light information 320, the remaining time-based entry directions are north and south. Accordingly, it may be seen that link 4 and link 2, which are the entry links in the navigation information 310, may be matched with the north and south, respectively, which are the entry directions of the traffic light information 320.

Next, an entry/exit link in the navigation information 310 is matched with the direction signal in the traffic light information 320. In FIG. 3C, link 4 of the navigation information 310 and north of the traffic light information 320 are used as references. That is, as illustrated in (FIG. 3C, among entry/exit link candidates (i.e., link 4→link 1, link 4→link 2, link 4→link 3, link 4→link 4 (U-turn)) based on link 4 in the navigation information 310, the entry/exit link based on vehicle flow according to real-time traffic information is link 4→link 2.

Furthermore, among the direction signal candidates (i.e., north→left turn, north→go straight, north→right turn, north→north (U-turn)) based on the north in the traffic light information 320, the direction signal based on the remaining time is North→go straight.

That is, it may be seen that, link 4→link 2, which is the entry/exit link based on vehicle flow, in the navigation information 310 is matched with north→go straight, which is a direction signal based on the remaining time.

Based on the aforementioned matching relationship, a matching table, such as FIG. 3D may be generated. According to FIG. 3D, it may be seen that, the intersection ID 101, entry direction (north), and direction signal (go straight) are matched with the node ID 1489, entry link ID (link 4), and exit link ID (link 2).

To facilitate understanding of the present disclosure, the matching table illustrated in FIG. 3D was generated for one entry direction (north) and one direction signal (go straight) based on one link (link 4), and a plurality of matching tables may be generated in the same manner for other entry directions and direction signals.

When traffic light information is received, the controller 120 may extract the remaining time of the direction signal based on the aforementioned matching table.

With reference to the aforementioned matching table, the intersection ID, entry direction, and direction signal matched with the node ID, entry link ID, and exit link ID of the navigation information are searched.

Thereafter, from the received traffic light information, the remaining time corresponding to the searched intersection ID, the searched entry direction, and the searched direction signal may be extracted.

Thereafter, the controller 120 may be configured to determine whether the vehicle may be able to past through the intersection 200 within the remaining time based on the extracted traffic light information in the driving direction.

As a result of the determination, when it is impossible to pass through the intersection 200 within the remaining time, an alarm may be output through the I/O unit 130. Alternatively, the controller 120 may reduce a speed of the vehicle through a vehicle controller if the vehicle cannot pass through the intersection 200 within the remaining time. In another exemplary embodiment of the present disclosure, if the controller 120 determines that the vehicle may pass through the intersection 200 within the remaining time by accelerating the speed of the vehicle, the controller 120 may accelerate the speed of the vehicle.

The I/O unit 130 may output an alarm under the control of the controller 120. Alternatively, the I/O unit 130 may receive a destination set by the driver or may display a route to the destination and a position of the vehicle on the map according to the set route.

Lastly, the storage unit 140 may store various programs and data to implement the functions performed by the controller 120 described above.

Herein, in an exemplary embodiment of the present disclosure, the storage unit 140 and the controller 120 may be implemented as separate semiconductor circuits. Alternatively, the storage unit 140 and the controller 120 may be implemented as a single integrated semiconductor circuit.

As described above, according to an exemplary embodiment of the present disclosure, the remaining time of the direction signal indicating the driving direction according to the navigation route may be extracted from traffic light information received in real time and notified to the driver or used for vehicle control, preventing the risk of accidents when the vehicle passes through a location, such as an intersection.

Figure 4:
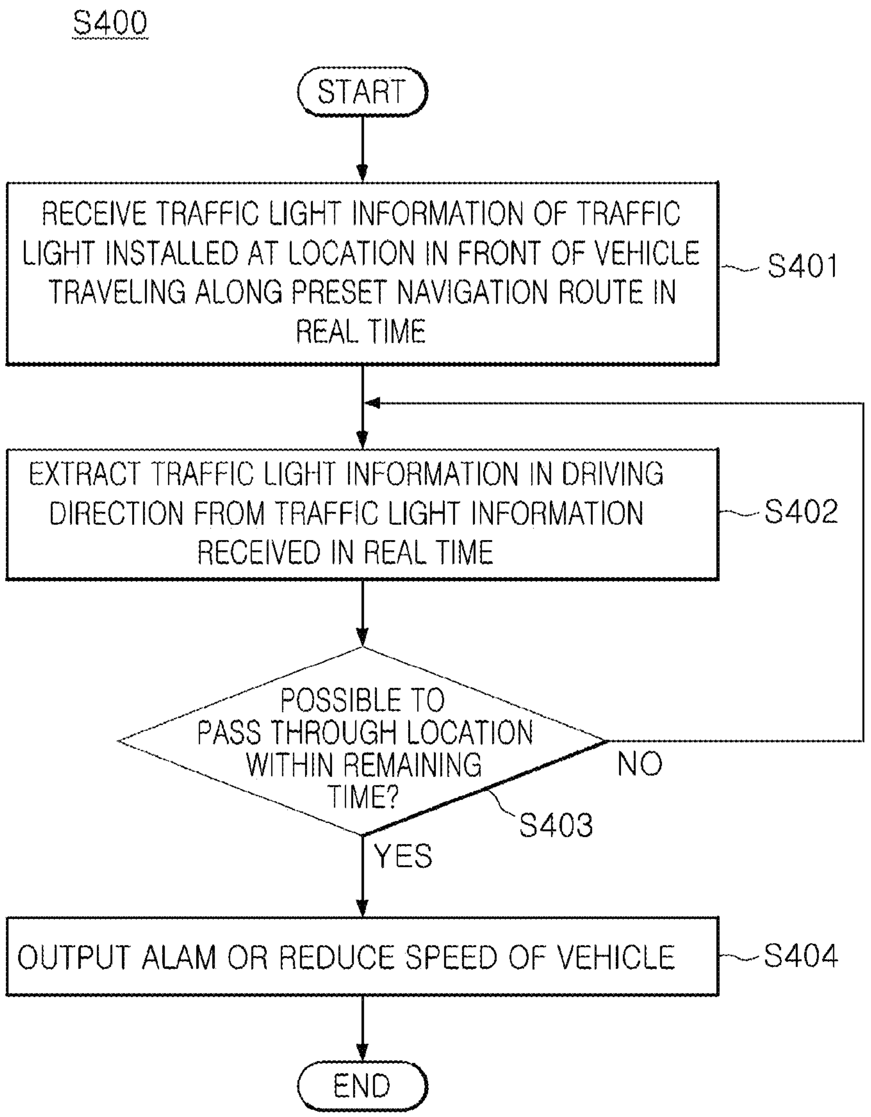
FIG. 4 is a flowchart illustrating a method of extracting traffic light information in a driving direction according to a navigation route according to an exemplary embodiment of the present disclosure.

Meanwhile, FIG. 4 is a flowchart illustrating a method of extracting traffic light information in a driving direction according to a navigation route according to an exemplary embodiment of the present disclosure.

Hereinafter, a method (S400) of extracting traffic light information in a driving direction according to a navigation route according to an exemplary embodiment of the present disclosure will be described with reference to FIGS. 1 to 4. However, for simplification of the present disclosure, redundant descriptions with FIGS. 1 to 3D are omitted.

Referring to FIGS. 1 to 4, the method (S400) of extracting traffic light information in a driving direction according to a navigation route according to an exemplary embodiment of the present disclosure may be started by receiving traffic light information of a traffic light provided at a location in front of the vehicle traveling along a preset navigation route in real time (S401). The aforementioned location may include an intersection or a crosswalk in which the traffic light is provided.

Next, the navigation apparatus 100 may extract traffic light information in the driving direction from the traffic light information received in real time (S402). Here, the traffic light information in the driving direction may include a remaining time of the direction signal indicating the driving direction according to the navigation route at the location.

According to an exemplary embodiment of the present disclosure, when the location is an intersection, when the navigation route is go-straight, the direction signal indicating the driving direction according to the navigation route may be a go-straight signal, if the navigation route is a left turn, the direction signal indicating the driving direction according to the navigation route may be a left turn signal, if the navigation route is a U-turn, the direction signal indicating the driving direction according to the navigation route is a stop signal, and if the navigation route is a right turn, the direction signal indicating the driving direction according to the navigation route may be a go-straight signal or a left turn signal.

Meanwhile, when the location is a crosswalk, if the navigation route is go-straight, the direction signal indicating the driving direction according to the navigation route is a go-straight signal, and if the navigation route is a U-turn, the direction signal indicating the driving direction according to the navigation route may be a stop signal.

According to an exemplary embodiment of the present disclosure, the navigation apparatus 100 may extract the remaining time of the direction signal based on a matching table in which the received traffic light information and navigation information are matched with each other.

The navigation apparatus 100 may search for a location ID, an entry direction, and a direction signal with which all of the node ID, entry link ID, and exit link ID are matched from the matching table. Thereafter, the navigation apparatus 100 may extract a remaining time corresponding to the searched location ID, the searched entry direction, and the searched direction signal from the received traffic light information.

Here, the navigation information may be map data information including the node ID of the node corresponding to the location, located on the navigation route, the name of the node, the position information of the node, and the link ID of each link connected to the node.

Furthermore, as described above, the received traffic light information may include the location ID of the location, the name of the location, the position information of the location, the entry direction to the location, the direction signal, and the remaining time.

Furthermore, according to an exemplary embodiment of the present disclosure, the aforementioned matching table may be generated in advance by matching the traffic light information with navigation information based on at least one of the real-time traffic information and link angle according to direction signals.

Furthermore, as described above, the aforementioned matching table may include the location ID, the entry direction, the direction signal, the node ID corresponding to the location ID, the ID of the entry link corresponding to the entry direction, and the ID of the exit link corresponding to the direction signal.

Thereafter, the navigation apparatus 100 may be configured to determine whether the vehicle is able to pass through the location within the remaining time based on the extracted traffic light information in the driving direction (S403).

As a result of the determination in operation S403, when it is possible to pass through the location within the remaining time, the process is terminated. Meanwhile, if, as a result of the determination in operation S403, it is not possible to pass through the location within the remaining time, the navigation apparatus 100 may output an alarm or reduce the speed of the vehicle (S404).

As described above, according to an exemplary embodiment of the present disclosure, the remaining time of the direction signal indicating the driving direction according to the navigation route may be extracted from traffic light information received in real time and notified to the driver or used for vehicle control, so that the risk of accidents when passing through a location, such as an intersection, may be prevented.

Figure 5:
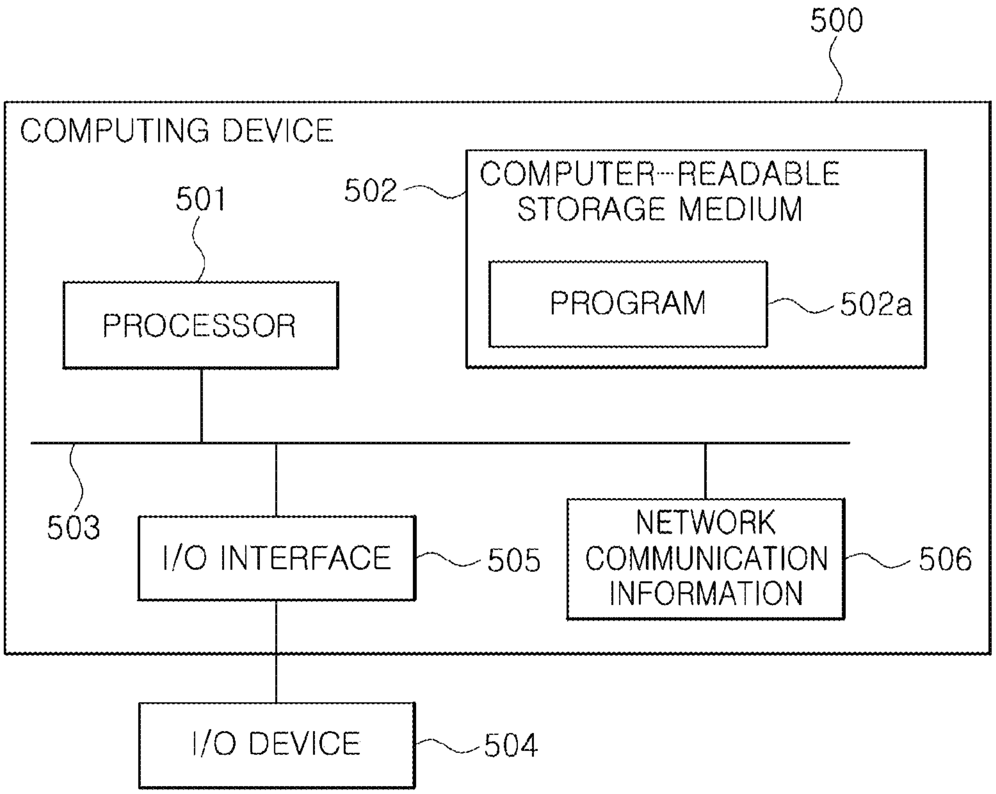
FIG. 5 is a block diagram of a computing device which may fully or partially implement a navigation apparatus for extracting traffic light information in a driving direction according to an exemplary embodiment of the present disclosure.

FIG. 5 is a block diagram of a computing device 500 that may fully or partially implement the navigation apparatus 100 for extracting traffic light information in a driving direction according to a navigation route according to an exemplary embodiment of the present disclosure.

As illustrated in FIG. 5, computing device 500 includes at least one processor 501, a computer-readable storage medium 502, and a communication bus 503.

The processor 501 may enable computing device 500 to operate according to the aforementioned example embodiments. For example, the processor 501 may execute one or more programs stored in the computer-readable storage medium 502. The one or more programs may include one or more computer-executable instructions, which, when executed by the processor 501, cause the computing device 500 to perform the operations according to example embodiments.

The computer-readable storage medium 502 is configured to store computer-executable instructions or program code, program data, and/or other suitable form of information. A program 502*a* stored in the computer-readable storage medium 502 includes a set of instructions executable by the processor 501. In an exemplary embodiment of the present disclosure, the computer-readable storage medium 502 includes a memory (a volatile memory, such as random access memory, a non-volatile memory, or appropriate combinations thereof), one or more magnetic disk storage devices, optical disk storage devices, flash memory devices, other types of storage mediums that may be accessed by the computing device 500 and store desired information, or appropriate combinations thereof.

The communication bus 503 interconnects various other components of the computing device 500, including the processor 501 and the computer-readable storage medium 502.

The computing device 500 may also include one or more I/O interfaces 505 and one or more network communication interfaces 506 providing an interface for one or more I/O devices 504. The I/O interface 505 and the network communication interface 506 are connected to the communication bus 503. The network may be a cellular network, such as global system for mobile Communications (GSM), enhanced data rates for GSM Evolution (EDGE), general packet radio service (GPRS), Code Division Multiple Access (CDMA), and time division-CDMA (TD-CDMA), Universal Mobile Telecommunications System (UMTS), Long Term Evolution (LTE), or one of other cellular networks.

The I/O device 504 may be connected to other components of computing device 500 through the I/O interface 505. The exemplary I/O device 504 may include, but are not limited to, input devices, such as a pointing device (such as a mouse or a trackpad), a keyboard, a touch input device (such as a touchpad or touch screen), a voice or sound input device, various types of sensor devices, and/or imaging devices and/or output devices, such as a display device, a printer, a speaker, and/or a network card. The exemplary I/O device 504 is a component forming the computing device 500 and may be included within the computing device 500 or may be connected to the computing device 500 as a separate device distinguished from the computing device 500.

According to an exemplary embodiment of the present disclosure, the remaining time of the direction signal indicating the driving direction according to the navigation route may be extracted from traffic light information received in real time and notified to the driver or used for vehicle control, preventing the risk of accidents when passing through a location, such as an intersection.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

Meanwhile, the exemplary embodiments of the present disclosure may include a program for performing the methods described in the present specification on a computer and a non-transitory computer-readable recording medium including the program. The non-transitory computer-readable recording medium may include program instructions, local data files, local data structures, etc., alone or in combination. The medium may be those designed and configured for the present disclosure or may be those commonly available in the computer software field. Examples of non-transitory computer-readable recording medium include magnetic medium, such as hard disks, floppy disks, and magnetic tapes, optical recording medium, such as CD-ROMs, DVDs, and hardware devices configured to store and perform program instructions, such as ROM, RAM, flash memory, etc. Examples of the program may include not only machine language code, such as that generated by a compiler, but also high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A navigation apparatus for extracting traffic light information in a driving direction according to a navigation route, the navigation apparatus comprising:

one or more processors; and a storage medium storing a computer-readable instruction, wherein the computer-readable instruction executed by the one or more processors, causes the one or more processors to:

receive traffic light information in real time from a traffic light provided in a location, located in front of a vehicle driving along a preset navigation route;

determine a driving direction of the vehicle entering the location based on the navigation route;

identify, based on the traffic light information received in real time, a direction signal corresponding to the determined driving direction;

extract a remaining time of the identified direction signal based on a matching table in which the received traffic light information and navigation information are matched with each other; and determine whether the vehicle is able to pass through the location based on the remaining time.

2. The navigation apparatus of claim 1, wherein the navigation information is map data information including a node ID of a node corresponding to the location, located in the navigation route, a name of the node, position information of the node, and a link ID of each link connected to the node, and wherein the received traffic light information includes a location ID of the location, a name of the location, position information of the location, an entry direction to the location, the direction signal, and the remaining time.

3. The navigation apparatus of claim 2, wherein the matching table includes the location ID, the entry direction, the direction signal, a node ID corresponding to the location ID, an ID of an entry link corresponding to the entry direction, and an ID of an exit link corresponding to the direction signal.

4. The navigation apparatus of claim 3, wherein the one or more processors are further configured to:

search for a location ID, an entry direction, and a direction signal with which all of the node ID, the entry link ID, and the exit link ID are matched from the matching table, and extract, from the received traffic light information, a remaining time corresponding to the searched location ID, the searched entry direction, and the searched direction signal.

5. The navigation apparatus of claim 1, wherein the one or more processors are further configured to match the traffic light information and the navigation information based on at least one of real-time traffic information and a link angle according to the direction signal.

6. The navigation apparatus of claim 1, wherein the one or more processors are further configured to:

output an alarm in response that the vehicle is not able to pass through the location within the remaining time as a result of the determination.

7. The navigation apparatus of claim 6, wherein the one or more processors are further configured to reduce a current speed of the vehicle in response that, as a result of the determination, the vehicle is not able to pass through the location within the remaining time.

8. The navigation apparatus of claim 1, wherein the location includes an intersection or a crosswalk in which the traffic light is provided.

9. The navigation apparatus of claim 8, wherein in response that the location is an intersection, in response that the navigation route is go-straight, the direction signal indicating the driving direction according to the navigation route is a go-straight signal, in response that the navigation route is a left turn, the direction signal indicating the driving direction according to the navigation route is a left turn signal, in response that the navigation route is a U-turn, the direction signal indicating the driving direction according to the navigation route is a stop signal, and in response that the navigation route is a right turn, the direction signal indicating the driving direction according to the navigation route is a go-straight ahead signal or a left turn signal, and in response that the location is a crosswalk, in response that the navigation route is go-straight, the direction signal indicating the driving direction according to the navigation route is a go-straight signal, and in response that the navigation route is a U-turn, the direction signal indicating the driving direction according to the navigation route is a stop signal.

10. A method of extracting traffic light information in a driving direction according to a navigation route, the method comprising:

receiving, by a processor, traffic light information in real time from a traffic light provided in a location, located in front of a vehicle driving along a preset navigation route;

determining a driving direction of the vehicle entering the location based on the navigation route;

identifying, based on the traffic light information received in real time, a direction signal corresponding to the determined driving direction;

extracting a remaining time of the identified direction signal based on a matching table in which the received traffic light information and navigation information are matched with each other; and determining whether the vehicle is able to pass through the location based on the remaining time.

11. The method of claim 10, wherein the navigation information is map data information including a node ID of a node corresponding to the location, located in the navigation route, a name of the node, position information of the node, and a link ID of each link connected to the node, and wherein the received traffic light information includes a location ID of the location, a name of the location, position information of the location, an entry direction to the location, the direction signal, and the remaining time.

12. The method of claim 11, wherein the matching table includes the location ID, the entry direction, the direction signal, a node ID corresponding to the location ID, an ID of an entry link corresponding to the entry direction, and an ID of an exit link corresponding to the direction signal.

13. The method of claim 12, wherein the extracting of the traffic light information in the driving direction includes searching for a location ID, an entry direction, and a direction signal with which all of the node ID, the entry link ID, and the exit link ID are matched from the matching table, and wherein extracting, from the received traffic light information, a remaining time corresponding to the searched location ID, the searched entry direction, and the searched direction signal.

14. The method of claim 10, further including matching the traffic light information and the navigation information based on at least one of real-time traffic information and a link angle according to the direction signal.

15. The method of claim 10, further including:

output an alarm in response that the vehicle is not able to pass through the location within the remaining time as a result of the determination.

16. The method of claim 15, further including reducing, by the processor, a current speed of the vehicle in response that, as a result of the determination, the vehicle is not able to pass through the location within the remaining time.

17. The method of claim 10, wherein the location includes an intersection or a crosswalk in which the traffic light is provided.

18. The method of claim 17, wherein in response that the location is an intersection, in response that the navigation route is go-straight, the direction signal indicating the driving direction according to the navigation route is a go-straight signal, in response that the navigation route is a left turn, the direction signal indicating the driving direction according to the navigation route is a left turn signal, in response that the navigation route is a U-turn, the direction signal indicating the driving direction according to the navigation route is a stop signal, and in response that the navigation route is a right turn, the direction signal indicating the driving direction according to the navigation route is a go-straight ahead signal or a left turn signal, and in response that the location is a crosswalk, in response that the navigation route is go-straight, the direction signal indicating the driving direction according to the navigation route is a go-straight signal, and in response that the navigation route is a U-turn, the direction signal indicating the driving direction according to the navigation route is a stop signal.

* * * * *